US012350219B1

(12) United States Patent
Chen

(10) Patent No.: US 12,350,219 B1
(45) Date of Patent: Jul. 8, 2025

(54) SEX TOY

(71) Applicant: Dongguan love angel electronic technology Co., LTD., Guangdong (CN)

(72) Inventor: Hao Chen, Guangdong (CN)

(73) Assignee: Dongguan love angel electronic technology Co., LTD., Guangdong (CN)

( * ) Notice: Subject to any disclaimer, the term of this patent is extended or adjusted under 35 U.S.C. 154(b) by 0 days.

(21) Appl. No.: 19/027,439

(22) Filed: Jan. 17, 2025

(30) Foreign Application Priority Data

Nov. 23, 2024 (CN) ......................... 202411686264.7
Nov. 23, 2024 (CN) ......................... 202422866782.9
Dec. 23, 2024 (CN) ......................... 202423193499.0

(51) Int. Cl.
*A61H 19/00* (2006.01)

(52) U.S. Cl.
CPC .................................... *A61H 19/32* (2013.01)

(58) Field of Classification Search
CPC ........ A61H 19/00; A61H 19/30; A61H 19/32; A61H 19/50
See application file for complete search history.

(56) References Cited

U.S. PATENT DOCUMENTS

2021/0015700 A1 * 1/2021 Truckai ................ A61H 9/0057

FOREIGN PATENT DOCUMENTS

| | | | | |
|---|---|---|---|---|
| CN | 105287183 | * 2/2016 | ............. | A61H 19/32 |
| CN | 110339044 | * 10/2019 | ............. | A61H 19/32 |
| CN | 110664603 | * 1/2020 | ............. | A61H 19/32 |
| CN | 109106401 | * 1/2021 | ............. | A61H 19/32 |
| DE | 202021105756 | * 12/2021 | ............. | A61H 19/32 |

* cited by examiner

*Primary Examiner* — Carrie R Dorna
(74) *Attorney, Agent, or Firm* — ScienBiziP, P.C.

(57) ABSTRACT

A massage mechanism is provided and includes a hollow shell formed with an opening at one end. The reproductive organ enters the hollow cavity of the shell along a first direction through the opening. A sleeve slidably mounted in the shell. A first driving member is configured to drive the sleeve to move. The first driving member is mounted in the shell and is connected to the sleeve. A colloid is configured to accommodate the reproductive organ, and a clamping member is configured to apply an inward contraction force and/or an outward expansion force to the colloid. The sleeve is capable of performing reciprocating movement along the first direction relative to the shell, the clamping member moves along the first direction following the sleeve, and the clamping member contracts inwards and/or expands outwards relative to the sleeve in the hollow cavity while moving along the first direction.

18 Claims, 10 Drawing Sheets

100

SEX TOY

CROSS-REFERENCE TO RELATED APPLICATIONS

This application claims the benefit of priority to Chinese Patent Application Number 202411686264.7 filed on Nov. 23, 2024, Chinese Patent Application Number 202422866782.9 filed on Nov. 23, 2024, and Chinese Patent Application Number 202423193499.0 filed on Dec. 23, 2024, in the China National Intellectual Property Administration. The entire contents of the above-identified application are hereby incorporated by reference.

TECHNICAL FIELD

The present disclosure relates to the field of adult products, in particular to a sex toy with synchronized stretching movement and expansion and contraction movement.

BACKGROUND

Sexual health is an important part of physical health, and sex toys used for males are favored by some people for their privacy, safety and convenience. General sex toys for males are featured by single stimulation method and poor user experience. Therefore, it is necessary to provide a sex toy for males with a variety of stimulation methods.

BRIEF DESCRIPTION OF DRAWINGS

Embodiments of the present disclosure will now be described, by way of embodiment, with reference to the attached figures. The structure, operation, and advantages of the present invention will become further apparent upon consideration of the following description taken in conjunction with the accompanying figures. The figures are intended to be illustrative, and not limiting.

DETAILED DESCRIPTION

Figure 1:
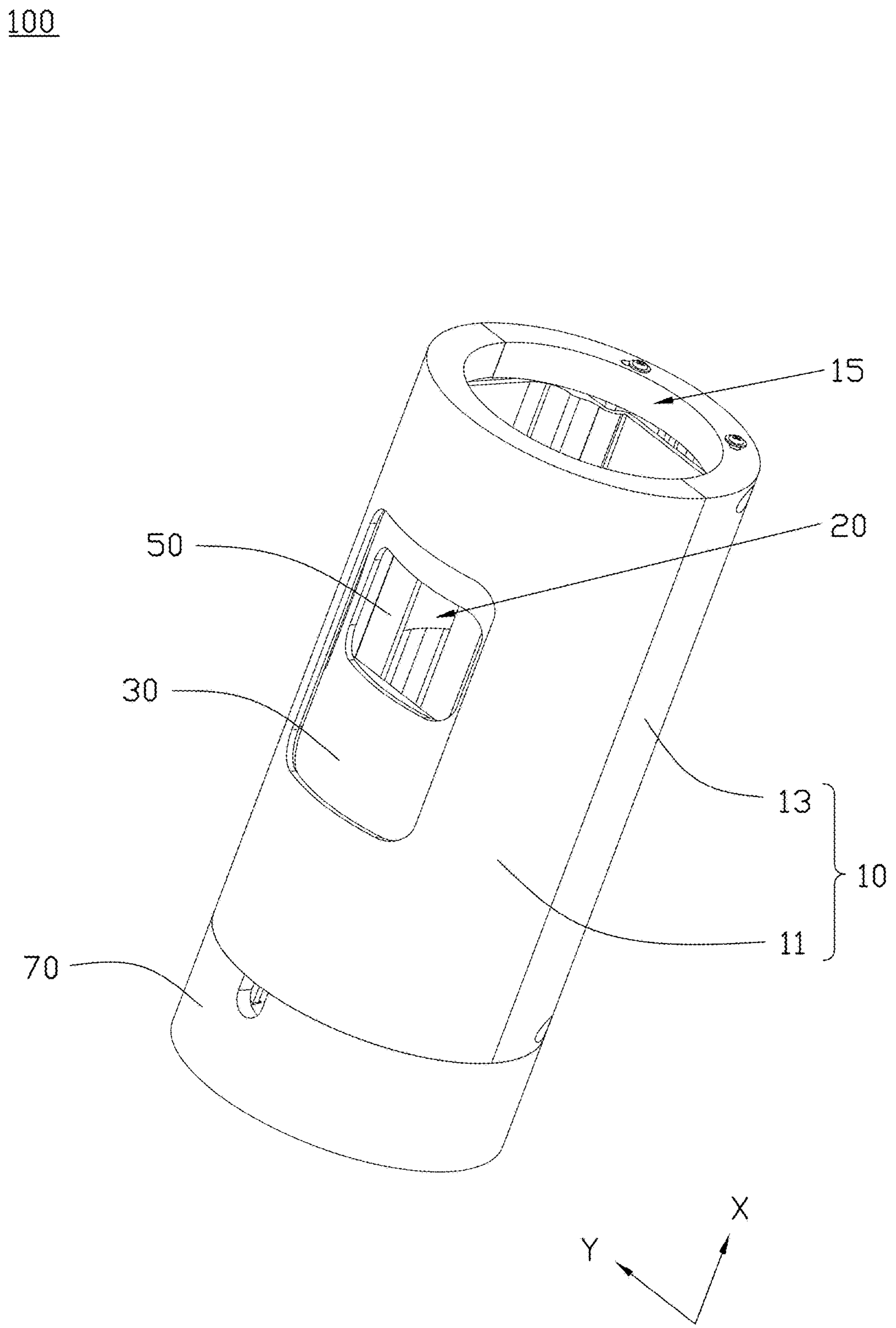
FIG. 1 is a perspective view of the sex toy according to an embodiment of the present disclosure.

In the description that follows, numerous details are outlined to provide a thorough understanding of the present invention. It will be appreciated by those skilled in the art that variations of these specific details are possible while still achieving the results of the present invention.

Exemplary illustrative embodiments of the invention should be interpreted as example(s) and non-limiting. The relationship between various arms, where they are located, their composition(s), their operation and sometimes their sizes relative to the desired operation of the invention are not significant.

Referring to FIG. 1 to FIG. 10, in the present embodiment, a sex toy 100 is provided for masturbation and massage of a male reproductive organ. The sex toy 100 includes a shell 10 with an opening 15, a sleeve 30 slidably mounted in the shell 10, a clamping member 50 movably connected to the sleeve 30, a colloid 40 in direct contact with the skin, a stretching mechanism 60 configured to drive the sleeve 30, and a back cover 70. The sex toy 100 is formed with a hollow cavity 20 for insertion of the male reproductive organ. The sleeve 30, the clamping member 50 and the colloid 40 are arranged in the hollow cavity 20 of the shell 10 in sequence from the outside in.

The sleeve 30 is capable of performing stretching movement in a reciprocating manner along a predetermined direction relative to the shell 10. The predetermined direction is defined as a first direction X. The clamping member 50 moves following the sleeve 30 in the first direction X and is stationary relative to the sleeve 30 in the first direction X. When the clamping member 50 performs stretching movement in the first direction X, the clamping member 50 is capable of performing an expansion and/or contraction movement relative to the hollow cavity 20 in a second direction Y perpendicular to the first direction X, so as to apply an inward contraction force and/or an outward expansion force to the colloid 40. The sleeve 30 and the clamping member 50 provide stimulation to the male reproductive organ from multiple directions.

One end of the shell 10 is connected to the exterior to form an opening 15, and the reproductive organ enters the hollow cavity 20 through the opening 15 and is accommodated in the hollow cavity 20. Another end of the shell 10 is mounted with a back cover 70. The shell 10 may be described as a cylinder having a closed bottom.

Figure 3:
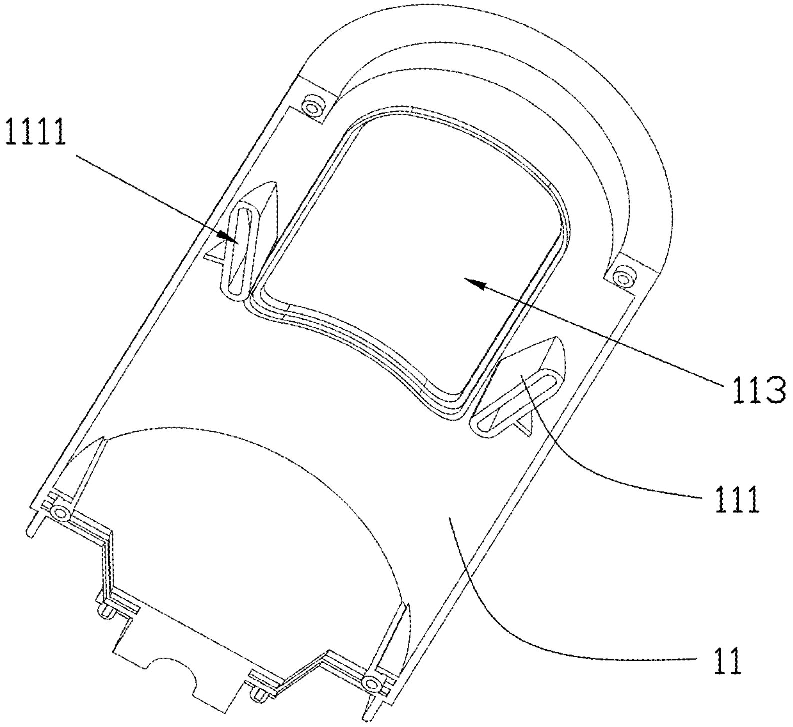
FIG. 3 is a perspective view of a first shell of the sex toy in FIG. 1.

The shell 10 includes a first shell 11 and a second shell 13 which are interconnected. Referring to FIG. 3, a first window 113 penetrates through the middle of the first shell 11, and an internal structure of the sex toy 100 can be seen through the first window 113. Two bumps 111 are arranged at both sides of the first window 113 and protrude towards the hollow cavity 20. The two bumps 111 may protrude by a size that is half the height of the first shell 11. The two bumps 111 extend from a side away from the opening 15 towards a side close to the opening 15 and are inclined towards the opposite side. The middle portion of the bump 111 is recessed inwards to form a first inclined groove 1111. The two bumps 111 are arranged opposite to each other, such that the two first inclined grooves 1111 are arranged opposite to each other. The spacing between ends, close to the opening 15, of the two first inclined grooves 1111 is greater than the spacing between ends, away from the opening 15, of the two first inclined grooves 1111.

The sex toy 100 is provided with a first driving member configured to connect the sleeve 30 with the shell 10 and drive the sleeve 30 to slide relative to the shell 10. A second driving member is further arranged in the sex toy 100 to connect the sleeve 30 with the clamping member 50 and drive the clamping member 50 to perform synchronized stretching movement following the sleeve 30. A third driving member is further arranged in the sex toy 100 to connect the clamping member 50 with the shell 10 and drive the clamping member 50 to contract inwards and/or expand outwards relative to the hollow cavity.

Figure 4:
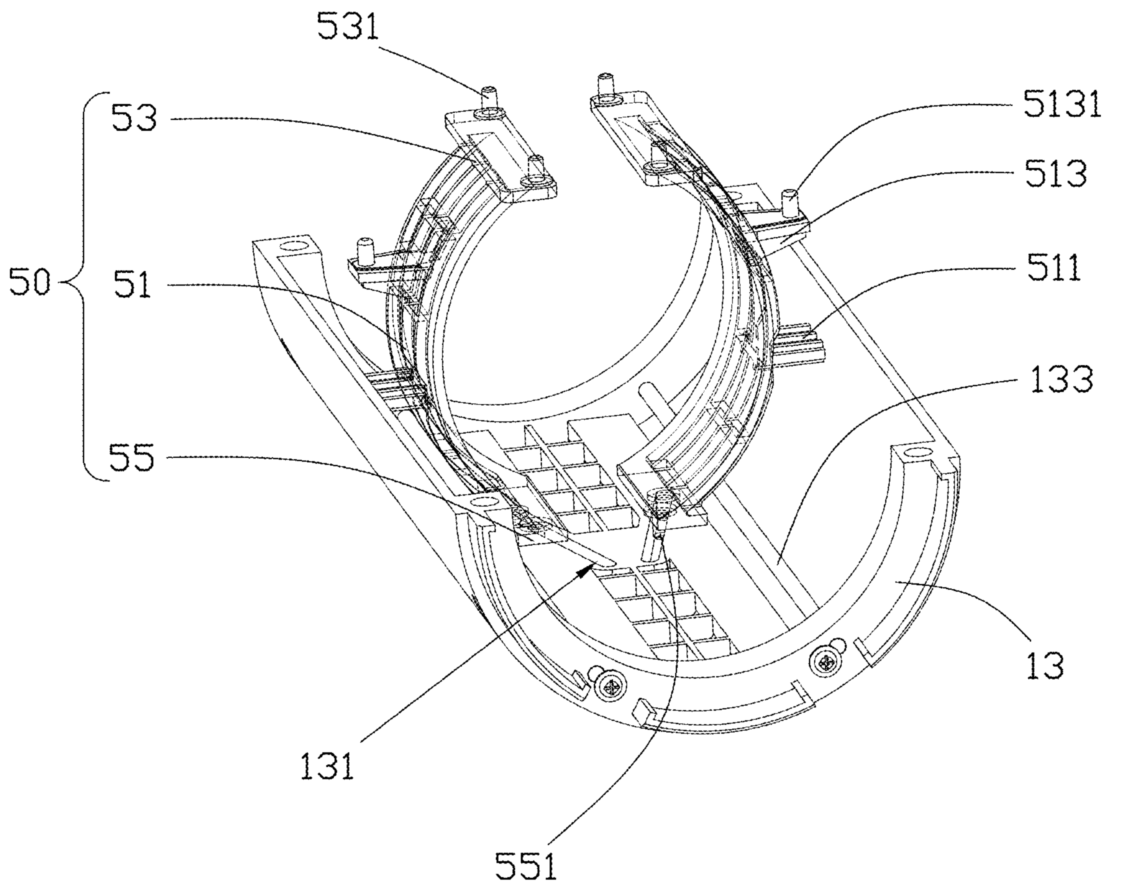
FIG. 4 is a perspective view of a second shell and a clamping member of the sex toy in FIG. 1.

Referring to FIG. 4, an inner wall of the second shell 13 is provided with two opposite second inclined grooves 131. The two second inclined grooves 131 extend from a side away from the opening 15 towards a side close to the opening 15 and are inclined towards the opposite side. The second inclined grooves 131 are formed when the inner wall of the second shell 13 is concave inwards, and the two second inclined grooves 131 may be a generally V-shaped structure. The spacing between the ends, close to the opening 15, of the two second inclined grooves 131 is greater than the spacing between ends, away from the opening 15, of the two second inclined grooves 131. The shape of the second shell 13 matches with the shape of the first shell 11 and the second shell 13 may be two semi-cylindrical bodies, such that the second shell 13 and the first shell 11 together form a cylindrical shell 10.

Further, the first inclined groove 1111 and the second inclined groove 131 have the same degree of inclination.

Further, in some exemplary embodiments of the present disclosure, the two first inclined grooves 1111 are located at two opposite sides of the first window 113, while no window may be arranged between the two second inclined grooves 131. The spacing between ends, close to the opening 15, of the two first inclined grooves 1111 is greater than the spacing between ends, close to the opening 15, of the two second inclined grooves 131. In some exemplary embodiments of the present disclosure, the first shell 11 is not provided with a first window 33 or the first window 33 is smaller, and the spacing of the two first inclined grooves 1111 may be equal to the spacing of the two second inclined grooves 131.

Further, the bottom of the second shell 13 is provided with two guide rails 133 arranged along the first direction X. The two guide rails 133 are arranged at both sides of the two second inclined grooves 131, respectively.

Figure 2:
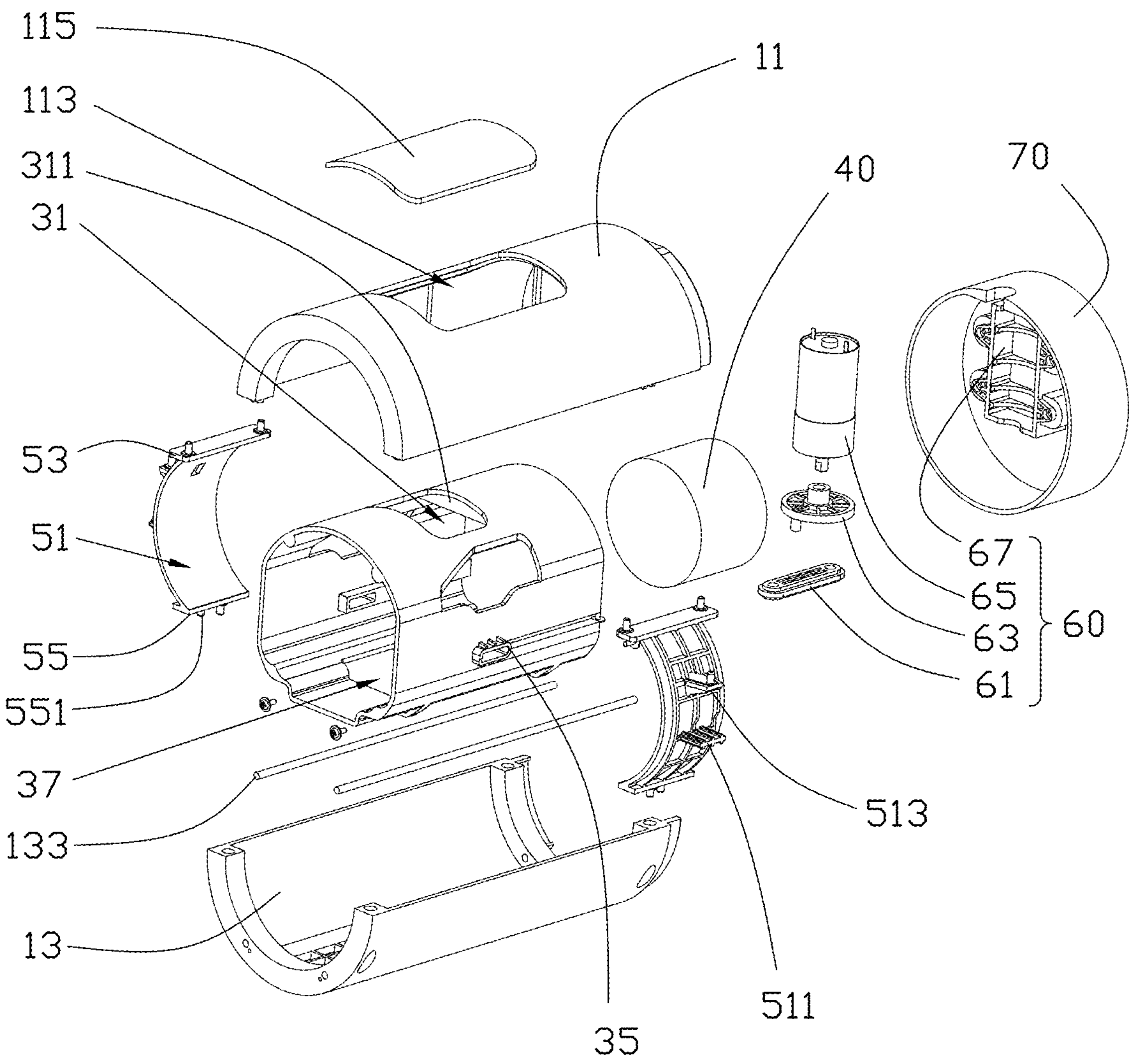
FIG. 2 is an exploded schematic diagram of the sex toy in FIG. 1.
Figure 5:
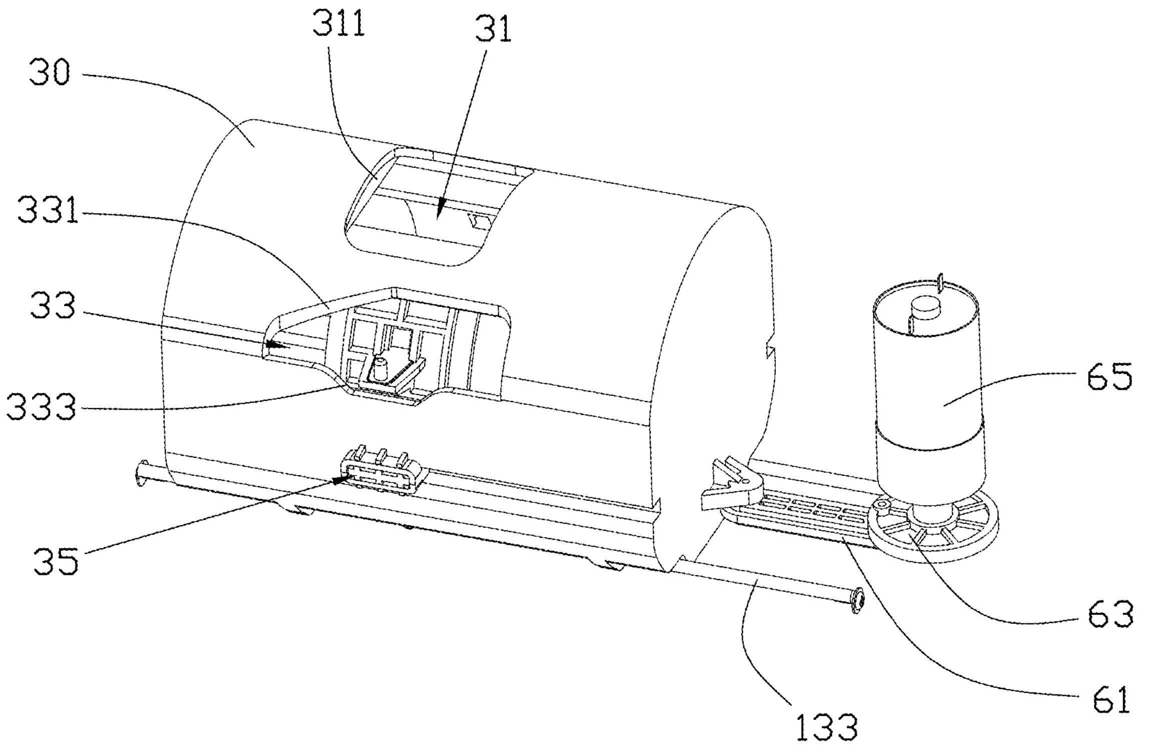
FIG. 5 is a perspective view of a sleeve and a stretching mechanism of the sex toy in FIG. 1.

Referring to FIG. 2 and FIG. 5, the sleeve 30 is mounted in the shell 10 and is connected to the two guide rails 133. The hollow cavity 20 is further defined by the sleeve 30 to accommodate the clamping member 50 and form a space for massaging. A second window 31 is formed at the position, corresponding to the first window 113, of the sleeve 30. The area of the second window 31 is smaller than the area of the first window 113. When the sleeve 30 performs reciprocating movement along the first direction X, at least a portion of the second window 31 overlaps with the first window 113.

The clamping member 50 is mounted at a position, corresponding to the second window 31, of the sleeve 30, such that the expansion and contraction movements of the clamping member 50 can be seen through the second window 31. The stretching movement of the sleeve 30 and the expansion and contraction movement of the clamping member 50 can be seen simultaneously through the first window 113, thereby providing a better visual experience for the user. In some exemplary embodiments of the present disclosure, the first window 113 is correspondingly provided with a cover 115, and the cover 115 may be made of a transparent material.

The first driving member can be a stretching mechanism 60. One end of the stretching mechanism 60 is connected to the shell 10, and another end is connected to the sleeve 30 and drives the sleeve 30 to slide relative to the shell 10. The stretching mechanism 60 includes a drive rod 61, an eccentric wheel 63, a motor 65 and a control member 67. The control member 67 can be controlled by setting a button on the back cover 70. The control member 67 transmits a signal to the motor 65 and starts the motor 65. The motor 65 drives the eccentric wheel 63 to rotate, and the eccentric wheel 83 drives the drive rod 61, at this time, the drive rod 61 performs stretching movement. One end of the drive rod 61 is connected to the eccentric wheel 63, and another end is connected to the sleeve 30. The drive rod 61 drives the sleeve 30 to move along the first direction X to achieve stretching movement.

One end of the guide rail 133 is fixed to the end, away from the opening 15, of the second shell 13 and extends towards the side close to the opening 15. The guide rail 133 passes through the aperture of the sleeve 30 and the other end is fixed to the end, close to the opening 15, of the second shell 13, such that the sleeve 30 and the second shell 13 are slidably connected. The guide rail 133 limits the sleeve 30, such that the sleeve 30 can only perform stretching movement in a reciprocating manner along the first direction X. The guide rail 133 is an elongated cylinder, thereby reducing the frictional force between the clamping member 50 and the surface of the guide rail 133 and resulting in smoother movement.

Figure 6:
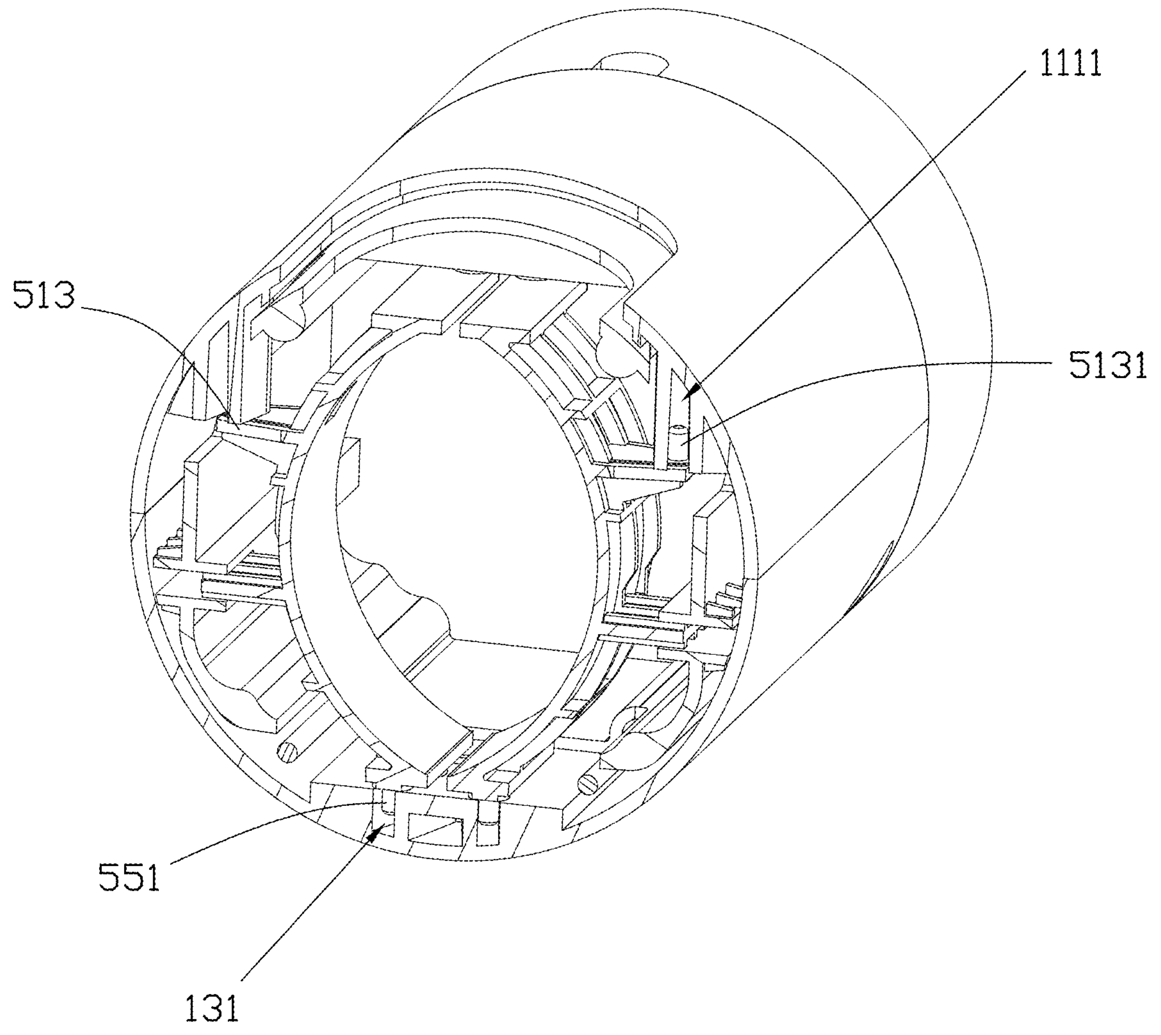
FIG. 6 is a schematic cross-sectional view of the sex toy, viewed in a second direction, in FIG. 1.

Referring to FIG. 4 and FIG. 6, the number of clamping members 50 may be two, and the two clamping members 50 are arranged opposite to each other along the second direction Y. The clamping member 50 includes a main body 51, an upper end portion 53 connected to the top of the main body 51, and a lower end portion 55 connected to the bottom of the main body 51. The two clamping members 50 are movably arranged at both sides of the sleeve 30 and partially extend into the interior of the sleeve 30. The main body 51 is a curved structure in which the middle portion protrudes relative to the two ends, such that the two clamping members 50 are opposite to each other to form a substantially circular space.

The middle portion of the main body 51, close to the first shell 11, of the clamping member 50 protrudes outwards to form an extension member 513. A top surface of the extension member 513 protrudes upwards to form a first protrusion 5131. The extension member 513 protrudes outwards from the main body 51 and extends to the shell 10, and the first protrusion 5131 is just snap-fitted into the first inclined groove 1111. A lower end portion 55 of the clamping member 50 protrudes downwards to form a second protrusion 551, and the second protrusion 551 is just snap-fitted into the second inclined groove 131.

Further, when the sleeve 30 performs reciprocating movement along the first direction X, the sleeve 30 drives the clamping member 50 to perform reciprocating movement along the first direction X. The first protrusion 5131 slides in the first inclined groove 1111 and the second protrusion 551 slides in the second inclined groove 131. Since the first inclined groove 1111 and the second inclined groove 131 are inclined by a certain degree, than the two clamping members 50 perform reciprocating expansion and contraction movements by moving towards or opposite to each other along the second direction Y. It will be understood that the number of the second protrusions 551 may be equal to the number of the first protrusions 5131, e.g., two. When the number of the second protrusions 551 is two, the length of the first inclined groove 1111 is equal to the length of the second inclined groove 131. In some exemplary embodiments of the present disclosure, the number of the second protrusions 551 may be a multiple of the number of the first protrusions 5131, e.g., four. When the number of the second protrusions 551 is four, each lower end portion 55 may be provided with two second protrusions 551. The two second protrusions 551 are arranged in an inclined manner, with an inclination degree being the same as that of the first inclined groove. The length of the second inclined groove 131 is greater than the length of the first inclined groove 1111.

While performing stretching movement along the first direction X, the clamping member 50 contracts inwards and/or expands outwards in the hollow cavity relative to the sleeve 30 by means of cooperation between the first protrusion 5131 and the first inclined groove 1111 and cooperation between the second protrusion 551 and the second inclined groove 131.

It can be understood that the sex toy 100 may be provided with only a first protrusion 5131 and a first inclined groove 1111 or only a second protrusion 551 and a second inclined groove 131.

Figure 7:
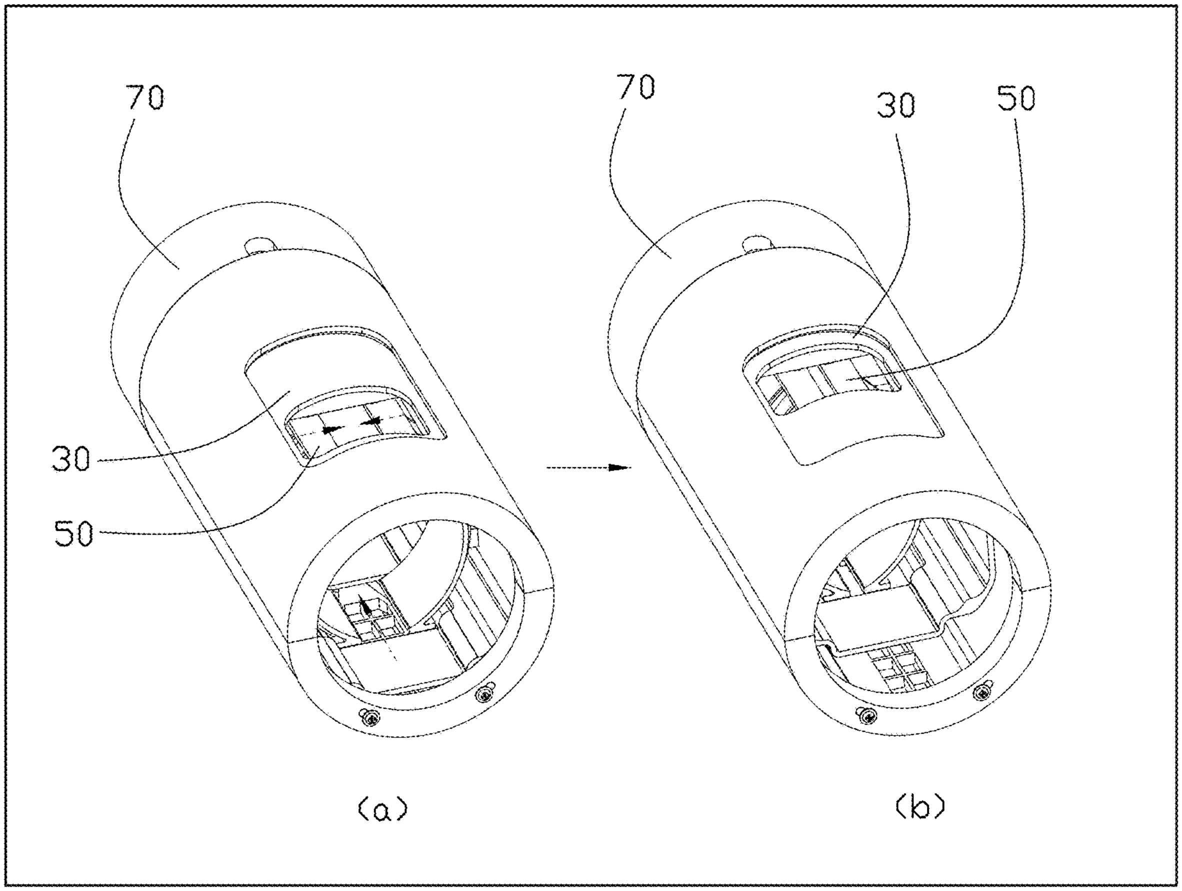
FIG. 7 is a diagram showing a changing state of the sex toy in FIG. 1 during operation, and state (a) shows a state of the sex toy during expansion, state (b) shows a state of the sex toy during contraction.

Referring to FIG. 7, (a) of FIG. 7 shows that the sex toy 100 is in an expansion state, and (b) of FIG. 7 shows that the sex toy 100 is in a contraction state. When the first protrusion 5131 slides from an end, close to the opening 15, of the first inclined groove 1111 to an end away from the opening 15, the clamping member 50 completes one contraction movement. When the first protrusion 5131 slides from an end, away from the opening 15, of the first inclined groove 1111 to an end close to the opening 15, the clamping member 50 completes one expansion movement. In some exemplary embodiments of the present disclosure, the third driving member may be implemented through cooperation between protrusions and oblique grooves.

Figure 8:
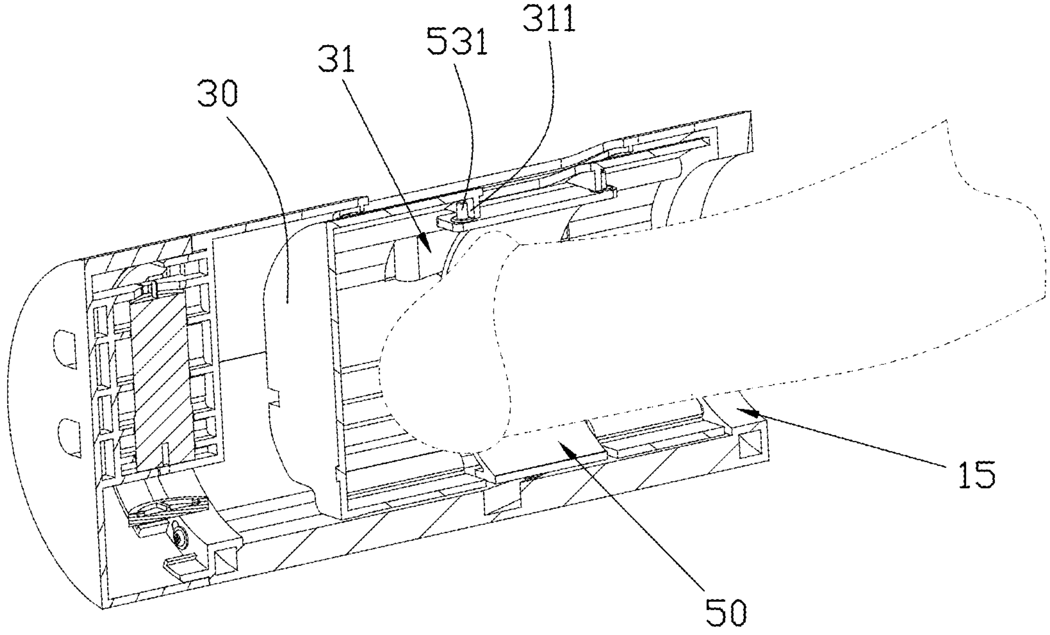
FIG. 8 is a schematic cross-sectional view of the sex toy in FIG. 1 in use.

Referring to FIG. 2 and FIG. 8, a lower surface of the sleeve 30 is formed with a through hole 37 which penetrates through the sleeve 30. The through hole 37 is interconnected with the two second inclined grooves 131, such that the clamping member 50 is connected to the second inclined grooves 131 via the through hole 37. In some exemplary embodiments of the present disclosure, the width of the through hole 37 in the first direction X may be greater than the width of the clamping member 50 in the first direction X, and the through hole 37 may accommodate the lower end portion 55. In some embodiments, the width of the through hole 37 in the first direction X may match with the width of the clamping member 50 in the first direction X, such that the lower end portion 55 may be snap-fitted into the through hole 37. Two opposite walls forming the through hole 37 and perpendicular to the first direction X abut against the two sides of the lower end portion 55, thereby limiting the clamping member 50 in the first direction X.

The two sides, perpendicular to the first direction X of the second window 31, protrude downwards to form two opposite limiting walls 311. The upper end portion 53 of the clamping member 50 protrudes upwards to form a third protrusion 531, and the number of the third protrusions 531 of each clamping member 50 may be two. Referring to FIG. 8, the spacing between the two third protrusions 531 of the same clamping member 50 matches with the spacing between the two limiting walls 311, such that the two third protrusions 531 are respectively snap-fitted into opposite sides of the two limiting walls 311. The third protrusions 531 and the limiting walls 311 limit their positions mutually along the first direction X, such that the two clamping members 50 move relative to each other along the two limiting walls 311.

A engagement groove 35 which penetrates through the sleeve 30 along the second direction Y is formed at a position, close to the second shell 13, of the sleeve 30. The clamping member 50 protrudes outwards to form a engagement member 511 corresponding to the engagement groove 35, and the engagement member 511 is snap-fitted into the engagement groove 35. The engagement groove 35 has a certain depth, and when the clamping member 50 performs expansion and contraction movements, a portion of the engagement member 511 is always located within the engagement groove 35.

The second driving member may be three structural connections between the through hole 37 and the lower end portion 55 of the clamping member 50, between the position-limiting wall 311 and the third protrusion 531 and between the engagement member 511 and the engagement groove 35, such that the clamping member 50 and the sleeve 30 perform synchronized stretching movement along the first direction X. It can be understood that the sex toy 100 may be provided with any one of the three structures only, or with a combination of any two of the three structures, or with a combination of all of the three structures.

Figure 9:
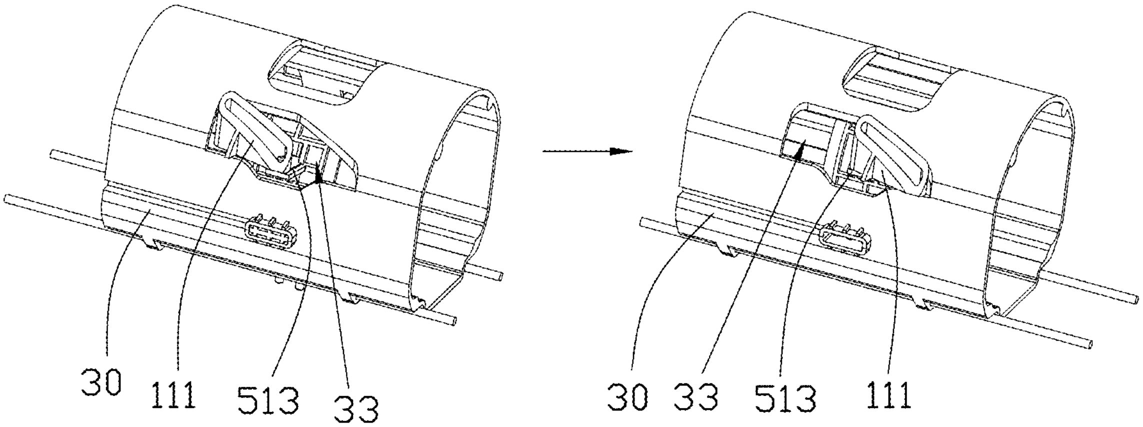
FIG. 9 is a schematic diagram showing a matching relationship between a bump and a wedge-shaped groove of the sex toy in FIG. 1.
Figure 10:
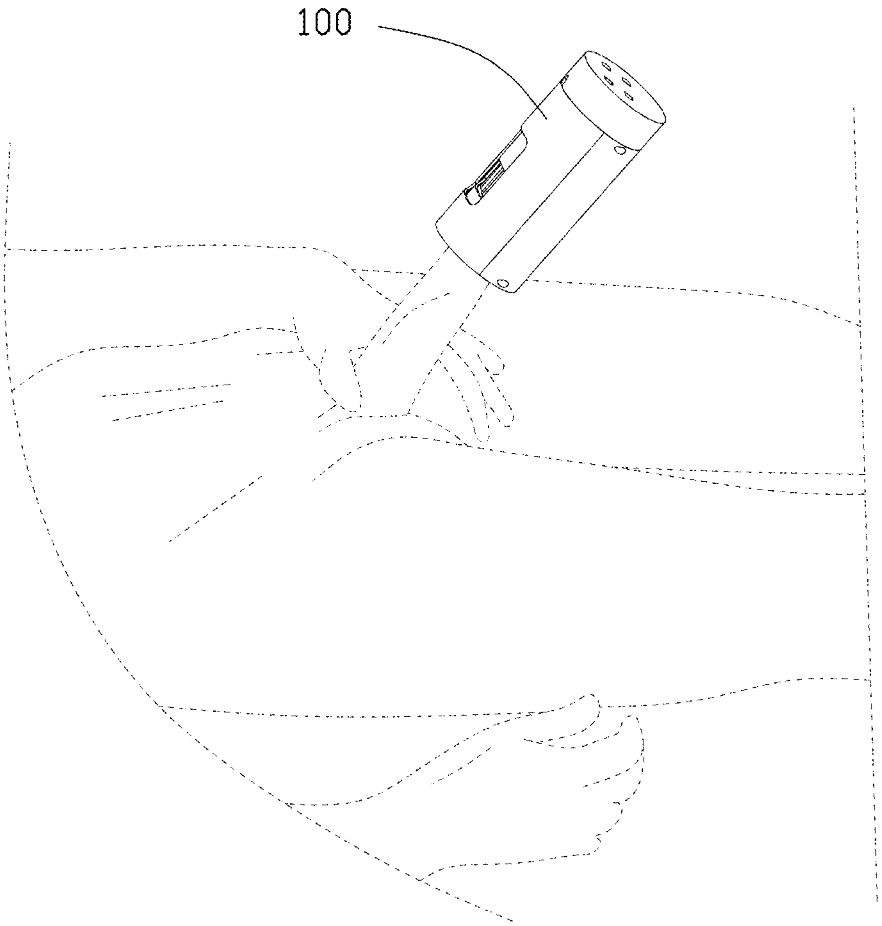
FIG. 10 is a schematic diagram of usage applications of the sex toy in FIG. 1.

A wedge-shaped groove 33 is formed in a side wall of the sleeve 30, and the wedge-shaped groove 33 is formed by a first wall 331 and a second wall 333. When the sleeve 30 performs reciprocating movement, the extension member 513 and the bump 111 are always located within the wedge-shaped groove 33. Therefore, when the sleeve 30 moves relative to the shell 10, the bump 111 does not influence movement of the shell 10. The shape of the first wall 331 matches with a movement trajectory of an upper surface, engaged with the inner wall of the first shell 11, of the bump 111. The shape of the second wall 333 matches with the movement trajectory of the lower surface of the bump 111 and the extension member 513. As shown in FIG. 9, a movement trajectory of the bump 111 when the bump 111 is snap-fitted into the wedge-shaped groove 33 is shown.

The back cover 70 encloses an end, opposite to the opening 15, of the sex toy 100, and the stretching mechanism 60 is arranged in the back cover 70. The back cover 70 is externally provided with buttons, and the sex toy 100 can be controlled by pressing the buttons.

The sex toy 100 is capable of completing various stimulations such as stretching, expansion and contraction, to produce stimulation in different directions. At the same time, movement of the internal structure can be seen through the window, and multiple layers of windows are arranged in the sleeve 30 and the shell 10 to observe movement of different parts, thereby enriching the user experience.

The contents not described in detail in this specification are known to those skilled in the art.

In the description of the present disclosure, it should be understood that terms such as “center”, “longitudinal”, “lateral”, “length”, “width”, “thickness”, “top”, “bottom”, “front”, “rear”, “left”, “right”, “vertical”, “horizontal”, “upper”, “lower”, “inner”, “outer”, “clockwise”, “counter-clockwise”, etc., indicate the orientation or positional relationship based on the orientation or positional relationship shown in the drawings. These terms are used for descriptive purposes and are not to be construed as limiting, indicating, or implying any particular orientation, construction or operation for the devices or arms referred to. Therefore, it should be understood that the terms “first,” “second,” etc., are used for descriptive purposes only and do not imply or suggest any relative importance or indicate the quantity of technical features indicated.

The foregoing illustrates and describes the basic principles and main features of the present disclosure and its advantages. Those skilled in the art should understand that the present disclosure is not limited to the embodiments described above. The embodiments and descriptions in the specification are intended only to illustrate the principles of the present disclosure. Within the scope and spirit of the present disclosure, various modifications and improvements can be made which fall within the scope of protection defined by the appended claims and their equivalents.

What is claimed is:

1. A sex toy configured to massage a male reproductive organ, comprising:

a hollow shell including a hollow cavity and an opening at one end, the hollow cavity of the shell configured to receive the reproductive organ along a first direction through the opening;

a sleeve slidably mounted in the shell;

a first driving member mounted in the shell and connected to the sleeve, the first driving member configured to drive the sleeve to move;

a colloid configured to accommodate the reproductive organ; and a clamping member configured to apply an inward contraction force and/or an outward expansion force to the colloid;

wherein the sleeve, the clamping member and the colloid are arranged in sequence from an outside to an inside in the hollow cavity of the shell, and under the driving of the first driving member, the sleeve performs reciprocating movement along the first direction relative to the shell; the sex toy further comprises a second driving member connecting the clamping member to the sleeve and a third driving member connecting the clamping member to the shell, the second driving member drives the clamping member to move along the first direction following the sleeve, and the third driving member drives the clamping member to contract inwards and/or expand outwards relative to the sleeve in the hollow cavity while moving along the first direction.

2. The sex toy according to claim 1, wherein the clamping member comprises a first arm and a second arm arranged at intervals, the third driving member comprises a protrusion arranged in the clamping member and an inclined groove arranged in the shell, the protrusion comprises a first sub-protrusion protruding from one end of the first arm and a second sub-protrusion protruding from one end of the second arm, the inclined groove comprises a first sub-groove corresponding to the first sub-protrusion and a second sub-groove corresponding to the second sub-protrusion, and the first sub-protrusion is engaged with the first sub-groove, and the second sub-protrusion is engaged with the second sub-groove, such that the clamping member slides in a reciprocating manner along the first sub-groove and the second sub-groove.

3. The sex toy according to claim 2, wherein the first sub-groove and the second sub-groove extend outwards in an inclined manner relative to the hollow cavity, and the spacing between one end, close to the opening, of the first sub-groove and one end, close to the opening, of the second sub-groove is greater than the spacing between one end, away from the opening, of the first sub-groove and one end, away from the opening, of the second sub-groove.

4. The sex toy according to claim 2, wherein a number of the first sub-groove and the second sub-groove is M, M is in a range of 1 to 2 a number of the first sub-protrusion and the second sub-protrusion is N, N is in a range of 1 to 2.

5. The sex toy according to claim 2, wherein the first arm and the second arm are bent structures.

6. The sex toy according to claim 1, wherein the second driving member is selected from one or more of the following structures:

a through hole is formed to penetrate through the sleeve, the through hole accommodates one end of the clamping member, an inner wall of the through hole abuts against the clamping member, or a side wall of the sleeve is formed with an engagement groove, the clamping member protrudes to form an engagement member corresponding to the engagement groove, the engagement member is engaged with the engagement groove, and at least a portion of the engagement member is located in the engagement groove when the clamping member contracts inwards and/or expands outwards in the hollow cavity relative to the sleeve, or an inner wall of the sleeve protrudes inwards to form two limiting walls, which is configured to limit the clamping member, the two limiting walls are arranged at relative intervals, the other end of the clamping member protrudes to form two third sub-protrusions, the two position-limiting walls are located between the two third sub-protrusions, and the two position-limiting walls abut against the two third sub-protrusions.

7. The sex toy according to claim 1, wherein the first driving member comprises a drive rod, an eccentric wheel, a motor and a control member, and the control member and the motor are mounted in the shell and are connected to the sleeve, the motor drives the eccentric wheel to rotate, the eccentric wheel drives the drive rod to move, one end, away from the eccentric wheel, of the drive rod is connected to the sleeve, and the drive rod drives the sleeve to stretch along the first direction.

8. The sex toy according to claim 1, wherein a first window configured to observe an interior of the shell is provided with the shell, a second window configured to observe an interior of the sleeve is arranged at a position, corresponding to the first window, of the sleeve, and when the sleeve slides relative to the shell, the second window overlaps with at least a portion of the first window.

9. A sex toy, comprising:

a shell formed with an opening at one end, wherein the shell is provided with a first window configured to observe an interior of the shell;

a sleeve slidably mounted in the shell and comprising a second window configured to observe an interior of the sleeve;

a clamping member slidably mounted in the shell; and a first driving member mounted in the shell and connected to the sleeve, the first driving member configured to drive the sleeve to perform reciprocating movement relative to the shell;

wherein when the sleeve slides relative to the shell, at least a portion of the sleeve is exposed outwards through the first window, at least a portion of the clamping member is exposed outwards through the second window, and at least a portion of the second window overlaps with the first window.

10. The sex toy according to claim 9, wherein an area of the second window is smaller than an area of the first window.

11. The sex toy according to claim 9, wherein the sex toy further comprises a second driving member configured to drive the clamping member to move following the sleeve and a third driving member configured to drive the clamping member to expand and/or contract while following the sleeve to stretch.

12. The sex toy according to claim 9, wherein a pair of opposite bumps protrude from an inner wall of the shell, and the bumps are arranged at two sides of the first window, and the sleeve further comprises a wedge-shaped groove configured to accommodate the bumps, and when the sleeve slides relative to the shell, the bumps slide in the wedge-shaped groove.

13. The sex toy according to claim 12, wherein the shape of an upper wall forming the wedge-shaped groove matches with a path of reciprocating movement at one side of the portion at which the bumps are engaged with the shell.

14. The sex toy according to claim 13, wherein the path is non-linear.

15. A sex toy configured to massage a male reproductive organ, comprising:

a hollow shell including a hollow cavity and an opening at one end, the reproductive organ being capable of entering the hollow cavity of the shell along a first direction through the opening;

a sleeve slidably mounted in the shell and moving along the first direction;

a first driving member mounted in the shell and connected to the sleeve, the first driving member configured to drive the sleeve to move along the first direction;

a colloid configured to accommodate the reproductive organ; and a clamping ring located between the sleeve and the colloid, the clamping ring comprising at least two ring arms spaced apart with each other, each ring arm comprising a base arranged in the circumference of the hollow cavity and a slider located between the sleeve and the base, the base mounted to the sleeve so as to make the clamping ring to move along the first direction following the sleeve;

wherein the sleeve, the clamping ring and the colloid are arranged in sequence from the outside to the inside in the hollow cavity of the shell, a plurality of sliding rails are defined in the sleeve, each of two adjacent sliding rails are arranged as a V shape to form a sliding path, two sliders of the two corresponding ring arms moves along the two adjacent rails, so as to make the clamping ring synchronously contracting inward and/or expanding outward relative to the sleeve in the hollow cavity while the sleeve moves along the first direction.

16. The sex toy according to claim 15, wherein a first window configured to observe an interior of the shell is provided with the shell, a second window configured to observe an interior of the sleeve is arranged at a position, corresponding to the first window, of the sleeve, and when the sleeve slides relative to the shell, the second window overlaps with at least a portion of the first window.

17. The sex toy according to claim 16, wherein an area of the second window is smaller than an area of the first window.

18. The sex toy according to claim 16, wherein when the sleeve slides relative to the shell, at least a portion of the sleeve is exposed outwards through the first window, at least a portion of the clamping ring is exposed outwards through the second window, and at least a portion of the second window overlaps with the first window.

* * * * *